United States Patent [19]

North

[11] 4,284,758
[45] Aug. 18, 1981

[54] GLYOXAL/CYCLIC UREA CONDENSATES
[75] Inventor: Bernard F. North, Rock Hill, S.C.
[73] Assignee: Sun Chemical Corp., New York, N.Y.
[21] Appl. No.: 207,248
[22] Filed: Nov. 17, 1980

Related U.S. Application Data

[63] Continuation-in-part of Ser. No. 92,630, Nov. 8, 1979, abandoned.

[51] Int. Cl.$^3$ ............................................. C08G 4/00
[52] U.S. Cl. ...................................... 528/245; 8/185; 8/186; 528/249; 528/252; 528/256; 528/259; 528/260; 544/67; 544/242; 548/353
[58] Field of Search ............... 528/245, 249, 252, 256, 528/259, 260; 544/67, 242; 548/353

[56] References Cited

U.S. PATENT DOCUMENTS

| | | | |
|---|---|---|---|
| 3,260,565 | 7/1966 | Beachem | 428/264 |
| 3,590,100 | 6/1971 | Weiland | 8/186 |
| 3,862,224 | 1/1975 | Petersen et al. | 528/245 |

FOREIGN PATENT DOCUMENTS 53-44567 4/1978 Japan .

*Primary Examiner*—A. Lionel Clingman
*Attorney, Agent, or Firm*—Cynthia Berlow

[57] ABSTRACT

Alkylated glyoxal/cyclic urea condensates are excellent formaldehyde-free crosslinking resins for textile fabrics.

5 Claims, No Drawings

GLYOXAL/CYCLIC UREA CONDENSATES

This application is a continuation-in-part of application Ser. No. 092,630 (filed Nov. 8, 1979), now abandoned.

This invention relates to novel textile finishing agents. More particularly it relates to novel finishing resins that impart permanent press characteristics to textile fabrics.

BACKGROUND OF THE INVENTION

The use of thermosetting resins or reactants to impart crease resistance and dimensional stability of textile materials is well-known in the art. These materials, known as "aminoplast resins", include the products of the reaction of formaldehyde with such compounds as urea, thiourea, ethylene urea, dihydroxyethylene urea, melamines, or the like. A serious drawback to the use of such materials is that they contain free formaldehyde. This is present during the preparation and storage of the finishing agent and its use in treating textiles, on the treated fabric, and on the finished garments. Also, when the fabrics or garments made therefrom are stored under humid conditions, additional free formaldehyde is produced.

The presence of even less than one percent of free formaldehyde, based on the total weight of the product, is undesirable, not only because of its unpleasant odor, but because it is an allergen and an irritant, causing severe reactions in the operators who manufacture the agent and who treat and handle the treated fabrics and to persons who handle and wear garments fabricated from the treated fabrics.

These problems associated with the presence of free formaldehyde on treated fabrics are well-known and considerable efforts have been made to produce formaldehyde-free textile fabrics. One solution to the problems has been to employ scavengers for the free formaldehyde. In U.S. Pat. No. 3,590,100 cyclic ethylene urea and propylene urea are disclosed as scavengers. Removal of the formaldehyde by reaction with phthalimide is disclosed in U.S. Pat. No. 3,723,058. U.S. Pat. No. 4,127,382 teaches certain nitrogen-containing heterocyclic compounds as scavengers.

Treating textiles with resin compositions that do not contain or evolve formaldehyde is also known, as in U.S. Pat. No. 3,260,565 which teaches finishing agents formed by the reaction of alkyl or aryl ureas or thioureas with glyoxal. These agents, however, have the disadvantage of having marginal permanent press properties. Finishing agents formed by the reaction of ethylene urea with glyoxal are disclosed in Japanese publication No. 5,3044-567, but they too do not have satisfactory properties.

SUMMARY OF THE INVENTION

It has now been found that the alkylated products of the reaction of glyoxal and cyclic ureas are excellent crosslinking resins for textile fabrics and do not contain formaldehyde.

DETAILED DESCRIPTION OF THE INVENTION

In accordance with the present invention, novel alkylated glyoxal/cyclic urea condensates are prepared that are useful for crosslinking textile fabrics The cyclic ureas which may be used have the following general formulas:

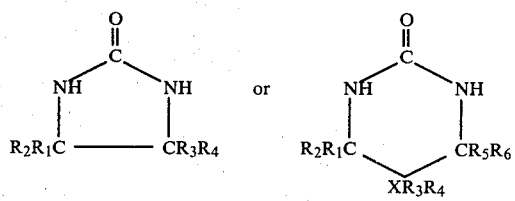

wherein $R_1$, $R_2$, $R_3$, $R_4$, $R_5$, and $R_6$ may be the same or different and each may be H, OH, COOH, R, OR, or COOR wherein R is an alkyl or a substituted alkyl group having 1 to 4 carbon atoms, and X may be C, O, or N; when X is O, $R_3$ and $R_4$ are each zero; when X is N, $R_3$ or $R_4$ is zero.

Typical examples of such compounds include, but are not limited to, ethylene urea, propylene urea, uron, tetrahydro-5-(2-hydroxyethyl)-1,3,5-triazin-2-one, 4,5-dihydroxy-2-imidazolidinone, 4,5-dimethoxy-2-imidazolidinone, 4-methyl ethylene urea, 4-ethyl ethylene urea, 4-hydroxyethyl ethylene urea, 4,5-dimethyl ethylene urea, 4-hydroxy-5-methyl propylene urea, 4-methoxy-5-methyl propylene urea, 4-hydroxy-5,5-dimethyl propylene urea, 4-methoxy-5,5-dimethyl propylene urea, tetrahydro-5-(ethyl)-1,3,5-triazin-2-one, tetrahydro-5-(propyl)-1,3,5-triazin-2-one, tetrahydro-5-(butyl)-1,3,5-triazin-2-one, and the like, and mixtures of these.

The alkylated condensates can be prepared by any suitable and convenient procedure. The cyclic urea and the glyoxal are generally reacted in stoichiometric amounts, although a slight excess of either of the reactants may be employed. The general range of glyoxal:cyclic urea is about 0.8–1.2:1. The reaction may be carried out within the temperature range of room temperature up to reflux, but preferably is run at about 50° to 60° C. for about two hours. The pH may range from about 2 to 7.0, and preferably it is within the range of about 5.0 to 7.0. The product is a water-soluble oligomer. These glyoxal/cyclic urea condensates are then partially or wholly alkylated, e.g., by reacting them with an alcohol such as methanol, ethanol, n-propanol, a butanol, and the like, and their mixtures. Another method involves reacting glyoxal with an alkylated cyclic urea.

The treating agent of this invention is suitable for use with cellulosic textile fabrics, woven or non-woven, including 100% cellulosic fabrics, e.g., cotton, rayon, and linen, as well as blends, e.g., polyester/cotton or polyester/rayon. Such blends preferably but not necessarily contain at least 20% of cellulose. Both white and colored (printed, dyed, yarn-dyed, cross-dyed, etc.) fabrics can be effectively treated with the resins of this invention. It is applicable also to fabrics containing fibers with free hydroxyl groups.

When applying the resin of this invention to a fabric, there generally will be present an appropriate catalyst. Typical catalysts include acids (such as hydrochloric, sulfuric, fluoboric, acetic, glycolic, maleic, lactic, citric, tartaric, and oxalic acids); metal salts (such as magnesium chloride, nitrate, fluoborate, or fluosilicate; zinc chloride, nitrate, fluoborate, or fluosilicate; ammonium chloride; zirconium oxychloride; sodium or potassium bisulfate); amine hydrochlorides (such as the hydrochloride of 2-amino-2-methyl-1-propanol); and the like, and mixtures thereof. The amount of catalyst generally is about 0.01 to 10 percent, and preferably about 0.05 to 5 percent, based on the weight of the padding bath.

The finishing agents may be applied to the textile fabric in any known and convenient manner, e.g., by dipping or padding, and will generally be applied from aqueous or alcoholic solution. The solvent may be water; an aliphatic alcohol, e.g., methanol, ethanol, or isopropanol; or a mixture of water and an aliphatic alcohol. Other conventional additives such as lubricants, softeners, bodying agents, water repellents, flame retardants, soil shedding agents, mildew inhibitors, antiwet soiling agents, fluorescent brighteners, and the like may be used in the treating bath in conventional amounts. Such auxiliaries must not, however, interfere with the proper functioning of the finishing resin, must not themselves have a deleterious effect on the fabric, and desirably are free of formaldehyde.

The amount of treating agent which is applied to the fabric will depend upon the type of fabric and its intended application. In general it is about 0.5 to 10 percent, and preferably about 2 to 5 percent, based on the weight of the fabric.

In the process of treating fabrics with the resins of this invention, the fabric is impregnated with an aqueous or alcoholic solution of the finishing resin, and the impregnated fabric is then dried and cured; the drying and curing steps may be consecutive or simultaneous.

If desired, the textile fabric may be finished by postcuring (also known as deferred or delayed curing). This consists of impregnating the fabric with a solution of the finishing resin and catalyst; drying the impregnated material carefully so that the finishing agent does not react; and then, after a prolonged interval, heating the material to a temperature at which the agent reacts under the influence of the catalyst.

Although this invention will be described with the use of the alkylated product of the reaction of a cyclic urea and glyoxal as a textile finishing agent in this application and as an insolubilizer for binders in paper coatings in copending application Ser. No. 092,631 (filed Nov. 8, 1979), it is not intended to be limited thereto. It is also suitable for use as a dry-strength or a wet-strength resin in paper; a hand-builder in textiles; a binder in particleboard, medium-density fiberboard, plywood, foundry and shell moldings, insulation materials including glass fiber mats, friction materials, coated and bonded abrasives, etc.; a component in molding compounds; an adhesive for wood and laminates; a film-forming resin in coatings and printing inks; an additive in fibers, e.g., rayon; an additive in rubber processing an agent in leather tanning; a textile size; a dry fixative for textiles; an impregnant for filters, e.g., automotive filters; and the like.

In order that the present invention may be more fully understood, the following examples are given by way of illustration. No specific details contained therein should be construed as limitations on the present invention except insofar as they appear in the appended claims. Unless otherwise specified, all parts and percentages are by weight.

EXAMPLE 1

290 Parts (2 moles) of a 40% aqueous solution of glyoxal was adjusted to pH 6.5 with sodium bicarbonate. 176 Parts (2 moles) of ethylene urea was added and the temperature raised to 55±5° C. The mixture was stirred at this temperature for two hours, maintaining the pH between 6.0 and 7.0. After two hours 200 parts (6.25 moles) of methanol was added and the pH adjusted to about 3.0 with concentrated sulfuric acid. The reaction was held at reflux for three hours to effect methylation, the resin solution cooled to 30° C., and the pH adjusted to about 7.0 with a 25% solution of caustic soda.

The product was a clear viscous liquid, pale yellow, with negligible odor. The reaction was essentially complete, as determined by IR and NMR analyses. IR analysis indicated that methylation had occurred.

EXAMPLE 2

360 Parts (2.5 moles) of a 40% aqueous solution of glyoxal was added to 905 parts (2.5 moles) of a 44% methanol solution of dimethyl methoxy propylene urea. The mixture was heated to 55±5° C. for two hours, the pH being maintained between 6.0 and 7.0. After cooling at 30° C. there was obtained a 45%-solids, slightly viscous, water-white solution with no odor of formaldehyde. The reaction was essentially complete, as determined by IR and NMR analyses.

EXAMPLE 3

The procedure of Example 1 was repeated except that the glyoxal was reacted with each of the following instead of ethylene urea: propylene urea, uron, tetrahydro-5-(2-hydroxyethyl)-1,3,5-triazin-2-one, and 4,5-dihydroxy-2-imidazolidinone. The results were comparable.

EXAMPLE 4

The procedure of Example 1 was repeated except that each of the following alcohols was used instead of methanol: ethanol, n-propanol, and isopropanol. The results were comparable.

EXAMPLE 5

The resin product of Example 1 was used to treat 100% cotton fabric. The test results are tabulated below and compared with those of a sample of the same fabric treated with a conventional formaldehyde-containing agent. In each case the solution of resin and catalyst was applied to samples of the fabric by padding with a wet pickup of about 60%, based on the weight of the fabric. The treated fabrics were dried by heating for 3 minutes at 107° C., and the resin cured on the fabrics by heating for 90 seconds at 171° C.

Wrinkle Recovery was measured by AATCC Test Method 66-1978 "Wrinkle Recovery of Fabrics: Recovery Angle Method".

Tensile was measured by ASTM Test Method D-1682-64 (Reapproved 1975) "Tensile-Grab-CRT Pendulum Type".

TABLE I

| | (a) | (b) | (c) |
|---|---|---|---|
| Reactant, parts | | | |
| A | 15.0 | | |
| B | | 15.0 | |
| Catalyst 531, parts | 4.5 | 4.5 | |
| Sulfanole ® RWD, part | 0.25 | 0.25 | |
| Tensile | | | |
| warp | 40 | 40 | 89 |
| fill | 16 | 15 | 37 |
| Wrinkle Recovery | | | |
| initial | 245 | 286 | 168 |

TABLE I-continued

|  | (a) | (b) | (c) |
|---|---|---|---|
| after 5 AHL | 245 | 280 | 173 |

A is the product of Example 1.
B is 1,3-bishydroxymethyl-4,5-dihydroxy-2-imidazolidinone (45% aqueous solution).
(c) is untreated 100% cotton fabric.
Catalyst 531 (Sun Chemical Corporation) is an activated magnesium chloride catalyst.
Sulfanole® RWD (Sun Chemical Corporation) is a non-ionic wetting agent.
AHL is average home launderings.

home launderings.

From these data it can be seen that the fabric treated with the product of this invention (a) is comparable in tensile strength and wrinkle recovery to the fabric treated with a commercial formaldehyde-containing agent (b) and has the advantage of being free of formaldehyde.

EXAMPLE 6

The procedure of Example 5 was repeated with the resin products of Examples 2, 3, and 4. The results were comparable.

EXAMPLE 7

An aqueous solution containing 15.0 parts of the resin product of Example 1 and 4.0 parts of Catalyst 531 was applied to samples of 65/35 polyester/cotton fabric by padding. The treated fabrics were dried; the resin cured on the fabrics by heating for 5 minutes at 150° C., 5 minutes at 177° C., and 1 minute at 193° C.; and the fabric smoothness determined by AATCC Test Method 124-1978 "Appearance of Durable Press Fabrics after Repeated Home Launderings". The results are tabulated below.

TABLE II

| Fabric Smoothness | (a) | (d) |
|---|---|---|
| after 1 AHL |  |  |
| 150° C. | 3.7 | 3.2 |
| 177° C. | 3.6 | 3.1 |
| 193° C. | 3.4 | 3.0 |
| after 5 AHL |  |  |
| 150° C. | 3.5 | 3.1 |
| 177° C. | 3.7 | 3.1 |
| 193° C. | 3.6 | 3.1 |
| after 10 AHL |  |  |
| 150° C. | 3.4 | 3.2 |
| 177° C. | 3.8 | 3.2 |
| 193° C. | 3.8 | 3.2 |

(d) is untreated 65/35 polyester/cotton fabric.

The whiteness of the fabric (a) was good, and the fabric showed no chlorine scorch either initially or after 5 launderings.

EXAMPLE 8

The following solutions were prepared, applied to 100% cotton, and tensile and wrinkle recovery measured as in Example 5:

TABLE III

|  | (a) | (e) | (c) |
|---|---|---|---|
| Reactant, parts |  |  |  |
| A | 15.0 |  |  |
| C |  | 15.0 |  |
| Catalyst 531, parts | 4.5 | 4.5 |  |
| Sulfanole® RWD, part | 0.25 | 0.25 |  |
| Tensile |  |  |  |
| warp | 40 | 41 | 89 |
| fill | 16 | 17 | 37 |
| Wrinkle Recovery |  |  |  |

TABLE III-continued

|  | (a) | (e) | (c) |
|---|---|---|---|
| initial | 245 | 199 | 168 |
| after 5 AHL | 245 | 187 | 173 |

A is the product of Example 1.
C is the product of the reaction of stoichiometric amounts of glyoxal and dimethyl urea (disclosed in U. S. Pat. No. 3,260,565).
(c) is untreated 100% cotton fabric.

From these data it can be seen that the fabric treated with the product of this invention (a) is comparable in tensile strength to the fabric treated with the reactant disclosed in U.S. Pat. No. 3,260,565 (e) and considerably superior to it in wrinkle recovery.

EXAMPLE 9

The procedure of Example 5 was repeated with each of the following fabrics instead of 100% cotton: 50/50 polyester/cotton, 65/35 polyester/cotton, 50/50 polyester/rayon, and 65/35 polyester/rayon. The results were comparable.

EXAMPLE 10

A sample of 65/35 polyester/cotton fabric was impregnated with an aqueous solution containing 20 parts of the product of Example 1, 5 parts of Catalyst KR (Sun Chemical Corporation's magnesium chloride catalyst), and 0.25 part of Sulfanole RWD. The fabric was then dried at 100° C. and stored at elevated temperature for several weeks. A crease was then pressed into the fabric, and it was cured for 15 minutes at 150° C. The fabric was washed and evaluated by AATCC Test Method 88C-1975 "Appearance of Creases in Wash-and-Wear Items after Home Laundering". It had an appearance rating of 5 as compared with a blank having a rating of 3.

EXAMPLE 11

To illustrate the superiority of an alkylated glyoxal/cyclic urea condensate over a nonalkylated glyoxal/cyclic urea condensate, the following experiments were carried out:

(1) 176 Parts of ethylene urea (2 moles) was reacted with 320 parts of 40% glyoxal (2.2 moles) at a pH of 6 and a temperature of 50°-60° C. for two hours. The product was then reacted with 200 parts of methanol (6.25 moles) at pH 3.0, and then adjusted to pH 6.0 and 45% solids. The temperature was lowered to, and held at, 48° C., and viscosity measurements were taken at intervals with a Brookfield Viscometer.

(2) 176 Parts of ethylene urea (2 moles) was reacted with 320 parts of 40% glyoxal (2.2 moles) at a pH of 6 and a temperature of 50°-60° C. for two hours. The product was adjusted with water to 45% solids. The temperature was lowered to, and held at, 48° C., and viscosity measurements were taken at intervals with a Brookfield Viscometer.

TABLE IV

| Viscosity, cps | (1) | (2) |
|---|---|---|
| initial | 52 | 26.5 |
| after weeks - 1 | 65 | gelled |
| - 2 | 107.5 |  |
| - 3 | 115 |  |
| - 4 | 127.5 |  |
| - 8 | 210 |  |
| - 9 | 232 |  |
| - 10 | 240 |  |

From these data it can be seen that the nonalkylated product (2) was unstable, gelling in one week, whereas the alkylated product (1) remained stable after 10 weeks at 48° C.

EXAMPLE 12

To illustrate the superiority of an alkylated glyoxal/cyclic urea condensate over a nonalkylated glyoxal/cyclic urea condensate as a textile treating agent, the following experiments were carried out:

(1) Japanese publication No. 5 3044-567- Example 1

300 Grams of ethylene urea was charged into a 4-necked flask equipped with a reflux condenser, a thermometer, and a stirrer and dissolved in 450 grams of water. Then 1 kg. of 40% glyoxal (glyoxal:ethylene urea ratio of 2:1) and 2 grams of concentrated hydrochloric acid were added. The mixture was reacted for three hours at 40° C. After cooling, the pH was adjusted to 5.0 with sodium hydroxide solution. The slightly colored transparent product had a solids content of 40%.

(2) Japanese publication No. 5 3044-567- Example 2

300 Grams of ethylene urea was charged into a flask as in (1) and dissolved in 450 grams of water. 750 Grams of 40% glyoxal (glyoxal:ethylene urea ratio of 1.5:1) and 2 grams of concentrated hydrochloric acid were added. The mixture was reacted for three hours at 40° C. After cooling, the pH was adjusted to 5.0 with sodium hydroxide solution. The slightly colored transparent product had a solids content of 40%.

15 Parts of each of these products and of the product of Example 1 was each mixed with 3.75 parts of an activated magnesium chloride catalyst and 0.25 part of Sulfanole RWD, and the solutions were applied by padding to samples of fabric. The treated fabrics were dried for 3 minutes at 107° C. and the resin cured on the fabrics by heating for 90 seconds at 177° C.

The blue and whiteness indexes of each were measured by AATCC Test Method 110-1975 and are tabulated as follows:

TABLE V

|  | (a) | (f) | (g) | (h) |
|---|---|---|---|---|
| cotton |  |  |  |  |
| blue index | 81.85 | 74.83 | 76.16 | 85.46 |
| whiteness index | 65.53 | 42.04 | 47.69 | 78.23 |
| 65/35 polyester/cotton |  |  |  |  |
| blue index | 78.99 | 70.07 | 72.51 | 82.35 |
| whiteness index | 57.63 | 29.51 | 37.74 | 67.62 |

(a) is the product of Example 1 of this application.
(f) is the product of Example 1 of Japanese publication No. 5 3044-567.
(g) is the product of Example 2 of Japanese publication No. 5 3044-567.
(h) is untreated fabric.

It is evident from these data that the product of this invention (a) is superior to the products of the Japanese publication (f) and (g) in both blue index and whiteness index. In addition, it was noted that the dry scorch on the fabrics treated with products (f) and (g) was extremely severe.

What is claimed is:

1. The alkylated product of the reaction of approximately stoichiometric amounts of glyoxal and one or more cyclic ureas.

2. The product of claim 1 wherein the ratio of glyoxal:cyclic urea is about 0.8-1.2:1.

3. The product of the claim 1 wherein the cyclic urea has the following formula:

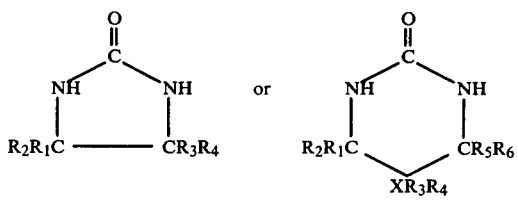

wherein $R_1$, $R_2$, $R_3$, $R_4$, $R_5$, and $R_6$ may be the same or different and each may be H, OH, COOH, R, OR, or COOR wherein R is an alkyl or a substituted alkyl group having 1 to 4 carbon atoms, and X may be C, O, or N; when X is O, $R_3$ and $R_4$ are each zero; when X is N, $R_3$ or $R_4$ is zero.

4. A water-soluble resinous product prepared by alkylating the product of the condensation of glyoxal and at least one cyclic urea, the ratio of glyoxal:cyclic urea being about 0.8-1.2:1.

5. The resinous product prepared by condensing glyoxal with at least one alkylated cyclic urea of claim 3.

* * * * *